United States Patent [19]

Brown et al.

[11] 4,372,164
[45] Feb. 8, 1983

[54] INDUSTRIAL PROCESS CONTROL INSTRUMENT EMPLOYING A RESONANT SENSOR

[75] Inventors: Christopher R. Brown; Everett O. Olsen, both of Wrentham, Mass.

[73] Assignee: The Foxboro Company, Foxboro, Mass.

[21] Appl. No.: 155,325

[22] Filed: Jun. 2, 1980

[51] Int. Cl.³ .............................................. G01L 9/00
[52] U.S. Cl. ....................................... 73/704; 73/708
[58] Field of Search ........... 73/704, DIG. 1, 517 AV, 73/708, 345, 702, 703

[56] References Cited

U.S. PATENT DOCUMENTS

| | | | |
|---|---|---|---|
| 3,046,789 | 7/1962 | Boss | 73/704 |
| 3,355,949 | 12/1967 | Elwood et al. | 73/345 |
| 3,543,585 | 12/1970 | Brown | 73/704 |
| 3,618,391 | 11/1971 | Rivkin et al. | 73/704 |
| 4,118,977 | 10/1978 | Olsen et al. | 73/DIG. 1 |
| 4,149,422 | 4/1979 | Olsen et al. | 73/704 |
| 4,165,651 | 8/1979 | Olsen et al. | 73/704 |
| 4,165,652 | 8/1979 | Olsen et al. | 73/704 |
| 4,198,867 | 4/1980 | Olsen | 73/704 |
| 4,221,133 | 9/1980 | Olsen et al. | 73/704 |
| 4,257,010 | 3/1981 | Bergman et al. | 331/65 |
| 4,297,872 | 11/1981 | Ikeda et al. | 73/702 |

OTHER PUBLICATIONS

Physical Review, vol. 132, No. 6, pp. 2373–2378, "Viscosity of Liquid He II", 12-1963.
"Vibrating Wire Viscometer", Review of Scien. Inst., vol. 35, No. 10, Oct. 1964, pp. 1345–1348.

Primary Examiner—Donald O. Woodiel
Attorney, Agent, or Firm—Ronald J. Paglierani; Andrew T. Karnakis

[57] ABSTRACT

An instrument for developing at a central control station a signal responsive to the value of a process condition occurring at a field measurement station remote from the central control station wherein a resonant device is used as the instrument basic sensor element. The resonant device which is located at the field station may be excited by either a voltage pulse or a continuous wave. In a particular aspect, the output measurement signal of the instrument is solely dependent upon the value of a desired measured variable, which is representative of a process condition, and is independent of other variables. The resonant device is coupled to excitation and detection circuitry located at the central control station and produces in the detection circuitry when excited with a pulse of energy first and second signals, one of which is dependent upon the desired measured variable and a second variable and the other dependent upon at least the second variable. These two signals are then combined according to known mathematical and physical principles to produce an output dependent upon the value of the desired variable.

14 Claims, 4 Drawing Figures

INDUSTRIAL PROCESS CONTROL INSTRUMENT EMPLOYING A RESONANT SENSOR

FIELD OF THE INVENTION

This invention relates to industrial process instruments for producing an electrical measurement signal corresponding to a pressure or force. More particularly, this invention relates to such instruments using a resonant device as the sensor element for the instrument.

BACKGROUND OF THE INVENTION

Pressure and force measuring instruments using a resonant device for the basic sensor element have been devised. Perhaps the most well known of these is an instrument that uses a taut wire which will have a vibrational resonant frequency related to the tension in the wire. By tensioning the wire in accordance with a pressure to be measured, the wire will vibrate at the resonant frequency corresponding thereto and produce a signal whose frequency is a measurement of that pressure. Moreover, there is a substantial patent art relating to such instruments; a selection of disclosures (not herein asserted to be a complete presentation of all such art), may be found in U.S. Pat. Nos. 2,445,021, 3,046,789, 3,071,725, 3,543,585, 4,118,977, 4,149,422, 4,165,651 and 4,165,652.

A typical example of the operation of such prior art instruments is represented by the disclosure found in the aforementioned U.S. Pat. No. 3,543,585. In this patent electronic circuitry is used to supply a train of current pulses to a vibrating wire at the natural vibration frequency of the wire. More particularly, there is described a forced vibration system employing as the driving function a feedback oscillator whose frequency determining element is the wire itself. One of the problems with these instruments is that in order to function in a reliable manner the electronic excitation circuitry must be placed relatively close to the vibrating wire. In process control applications this often necessitates placing sensitive electronic hardware close to a hostile process environment.

Theoretical considerations applicable to such instruments indicate that they should be capable of extremely accurate measurements, and thus substantial effort has been devoted to the development of such apparatus. Out of this effort has come a considerable number of proposals for various kinds of instruments, and some designs have been offered commercially. Errors in these instruments due to changes in the resonant frequency of the wire caused by temperature variations at the field location of the sensor element itself have resulted in the reduction of the utility of these instruments for some commercial purposes. These temperature errors can be classified into two general types, firstly, the type involving changes in the damping factor of the wire and secondly, the type involving variance in wire tension brought about by changes in the length of the wire different from the length changes in the wire's support members, hese differences being caused by the wire and the members having different thermal coefficients of expansion. Some instruments exhibit both types of errors and these errors may be of a significant nature in certain commercial applications.

Numerous efforts have been made to reduce these temperature errors. Some efforts have involved the use of techniques whereby these temperature errors are nulled out by temperature dependent electrical or mechanical effects, in such a manner that the output frequency of the vibrating wire itself is used to represent the temperature compensated value of the pressure to be measured. For example, U.S. Pat. No. 4,149,422 matches changes in length of the vibrating wire with overall changes in length of its support members thereby creating a mechanical nulling effect while U.S. Pat. No. 4,065,652 uses a temperature sensitive inductor to electrically null out the effect of viscosity changes in the liquid surrounding the wire. None of these efforts has involved techniques whereby the wire output frequency is related at the central control station to the measured value of a second temperature dependent characteristic of the wire.

SUMMARY OF THE INVENTION

The present invention relates to instrumentation systems that provide accurate output measurement signals suitable for use in industrial environments through the excitation of resonant means. Preferably the resonant means, which are connected by a two-wire line to suitable excitation circuitry, are energized by a voltage pulse once each operating cycle of the instrument to provide a free vibration response. In this manner, the effect of the line capacitance is considerably reduced. This permits the resonant means to be separated from the excitation and corresponding detection circuitry by substantial distances (e.g., 1 mile).

In a preferred embodiment of the invention to be described in detail herein below, there is provided a vibrating wire instrument wherein the wire itself is surrounded by a liquid and the resultant combination along with its housing is adapted to be field mounted adjacent an unknown differential pressure to be measured. The wire is connected by a two-wire line to excitation and detection circuitry located at a distant central control station. The resonant characteristics of the wire (i.e., resonant frequency and damping factor) are dependent upon the desired measured variable, the differential pressure, and another variable, the liquid temperature, in such a manner that the resonant frequency is dependent mainly upon the pressure and to a lesser extent the temperature while the damping factor is dependent mainly on the temperature and to a lesser extent the pressure.

Included as part of the excitation circuitry is a pulse generator for supplying a pulse of energy once each operating cycle to the vibrating wire. This pulse of energy causes the vibrating wire to oscillate at its resonant frequency in a damped sinusoidal manner and produce an electrical signal in correspondence therewith. The detection circuitry includes a first detector responsive to the frequency of the vibrating wire signal and a second detector responsive to the damping-factor-related half amplitude time of the signal produced at the output of the wire. Included at the central control station is a signal processor for combining the first detector signal and the second detector signal in accordance with known mathematical and physical principles so as to develop an output measurement signal dependent upon the value of the differential pressure and independent of the temperature.

Alternately, the vibrating wire can be combined with somewhat different excitation and detection circuitry. In this approach, the excitation circuitry includes an oscillator to supply over a two-wire line a continuous wave of energy so as to maintain the wire vibrating at its resonant frequency. The resonant characteristics of the wire are reflected back to the oscillator through the two-wire line to set both the oscillator frequency and the magnitude of such oscillations in accordance with the differential pressure-temperature dependence. The detection circuitry includes a first detector responsive to the frequency of the vibrating wire signal and a second detector responsive to the damping factor related magnitude of the vibrating wire signal. These signals are then combined as described above at the central control station by the signal processor.

PREFERRED EMBODIMENT

Figure 1:
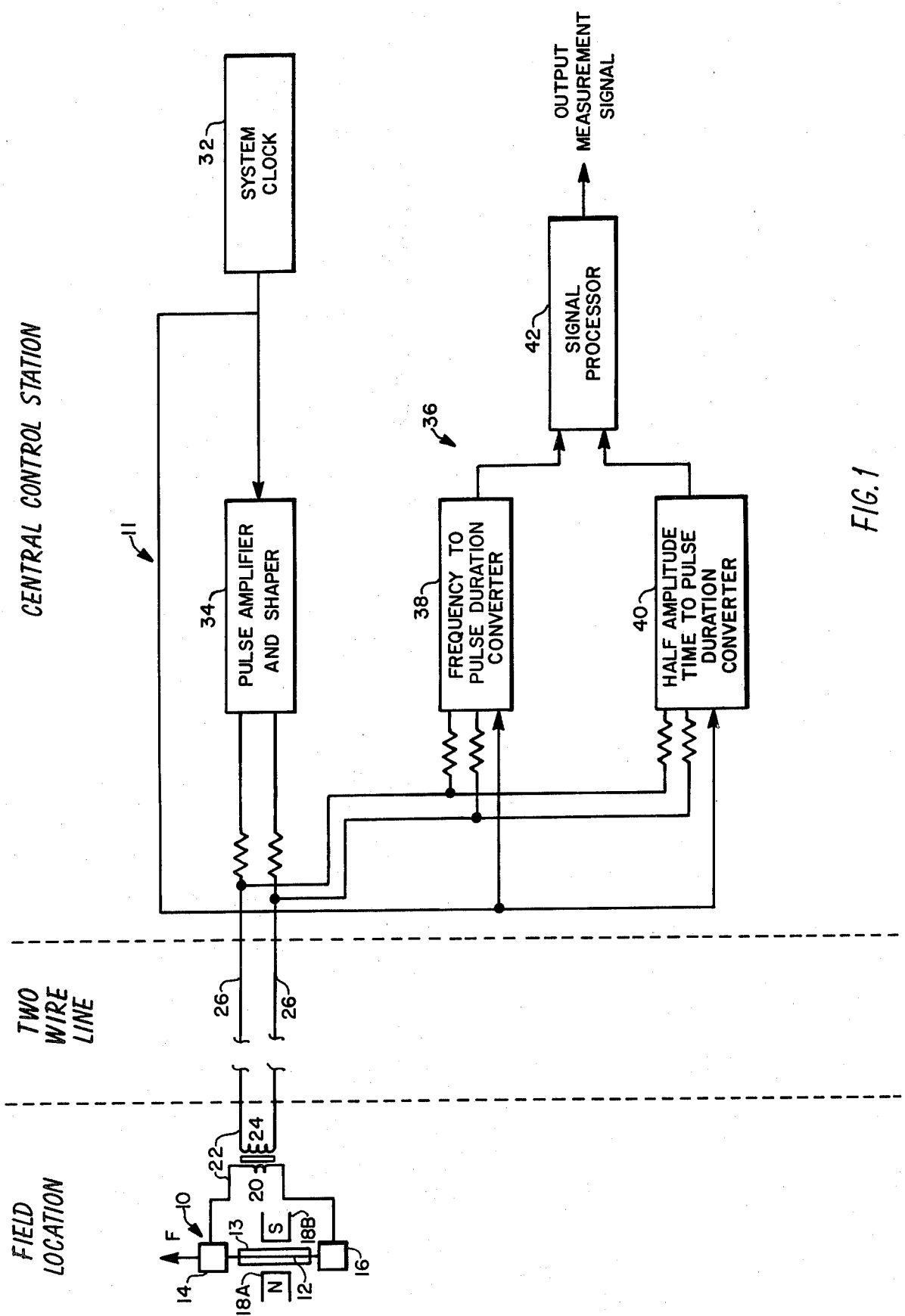
FIG. 1 is a combination block diagram-schematic of the preferred embodiment of the invention.

Referring now to the left-hand portion of FIG. 1, there is shown in diagramatic form the mechanical components of a field mounted differential pressure vibrating wire transducer 10, which along with excitation and detection circuitry located, in turn, at distant central control station 11, form a vibrating wire type instrument for measuring differential pressure. These components include an electrically conductive wire 12 held tautly between a pair of terminals 14 and 16 and disposed in the gap between the poles 18a, 18b of a permanent magnet arranged to develop a magnetic field perpendicular to the axis of the wire.

Surrounding the wire for the majority of its length is a tube 13 containing a non-conducting liquid of relatively low viscosity. These mechanical components are positioned adjacent the differential pressure to be measured and they, along with the low viscosity liquid, may be subject to an extremely wide range of temperatures such as from −50° F. to +250° F. As indicated by the vertical arrow, a force F is applied to the wire 12 to control the tensioning thereof so that its resonant frequency to vibration will be a function of the force. Details of such a vibrating wire differential pressure transducer, including suitable means for developing the wire tensioning force so as to be dependent upon such differential pressure and for surrounding the wire with the low viscosity liquid, are shown in U.S. Pat. No. 4,165,651, whose disclosure is hereby incorporated by reference. Thusly, the resonant frequency of the wire is dependent upon the differential pressure.

The resonant frequency of vibration of the wire 12 is also dependent, but to a lesser extent, on the liquid temperature. On the other hand, the damping factor of the wire is also both dependent upon the differential pressure and the liquid temperature but in this case more dependent upon the temperature than the pressure. Thusly, determining both the damping factor (or a term dependent thereon) and the resonant frequency enables the differential pressure to be determined.

The wire terminals 14 and 16 are connected to respective ends of one winding 20 of a transformer 22. The other transformer winding 24 is connected to a two-wire line 26 which in turn is connected to the distant central control station 11. The overall arrangement thus forms a conventional two-wire instrumentation system wherein the field mounted transducer and associated electronics receive operating power from the central control station along the two-wire line. For sake of clarity power connections are not shown but are well known to those skilled in the art.

In brief, the circuitry contained at the control station includes a system clock 32 which in conjunction with a combination pulse shaper/amplifier 34 produces a pulse of energy once each operating cycle. When a pulse of energy is transmitted over the line 26 and through the transformer 22, it will provide excitation energy to cause the vibrating wire 12 to freely vibrate (i.e., without the need of a forcing function) in the liquid at its resonant frequency producing, in turn, at the terminals 14 and 16 an induced voltage signal of a damped sinusoidal nature. Such induced voltage signal passes through the transformer 22 and is transmitted back through the two-wire line 26 to detection circuitry 36 which is also located at the central control station. Use of pulse excitation results in the effect of the line capacitance being considerably reduced. This permits the vibrating wire transducer to be separated from the excitation and detection circuitry by substantial distances (e.g., 1 mile).

At the central control station the signal is fed simultaneously to a frequency-to-pulse duration converter 38 and to a half amplitude time-to-pulse duration converter 40. The system clock 32 synchronizes each of these converters to respond to this common signal appearing at their respective inputs.

The frequency-to-pulse duration converter 38 produces a pulse whose duration is dependent upon both the differential pressure and the temperature of the liquid surrounding the wire 12. Similarly, the half amplitude time-to-pulse duration converter 40 produces a pulse whose duration is proportional to the time for the damped voltage to decay to one half the value it had at a predetermined time following the pulsing of the wire. This half amplitude time signal is related to the damping factor making it (i.e., the half amplitude time) also dependent upon the surrounding liquid temperature and the resonant frequency. Hence, measuring both the resonant frequency and the half amplitude time is a way of enabling the differential pressure to be determined. Both of these signals are then fed to a signal processor 42.

The signal processor 42 uses well known digital signal processing techniques to firstly, determine the temperature of the liquid surrounding the wire from the information contained in both the output of the half amplitude time-to-pulse duration converter 40 and the output of the frequency-to-pulse duration converter 38 and secondly, to use this temperature information to enable the temperature dependence of the output of the frequency-to-pulse duration converter 38 to be determined, thereby enabling production of an output measurement signal dependent upon the value of the differential pressure and independent of the value of the liquid temperature. These signal processing techniques are carried out in accordance with well-known mathematical and physical principles and are not to be considered as an integral part of this invention. Furthermore, digital processing of signals associated with transducers is well known in the art as evidenced, for example, by U.S. Pat. No. 3,918,304 issued to Abruzzo et al, to which reference may be made.

Figure 2:
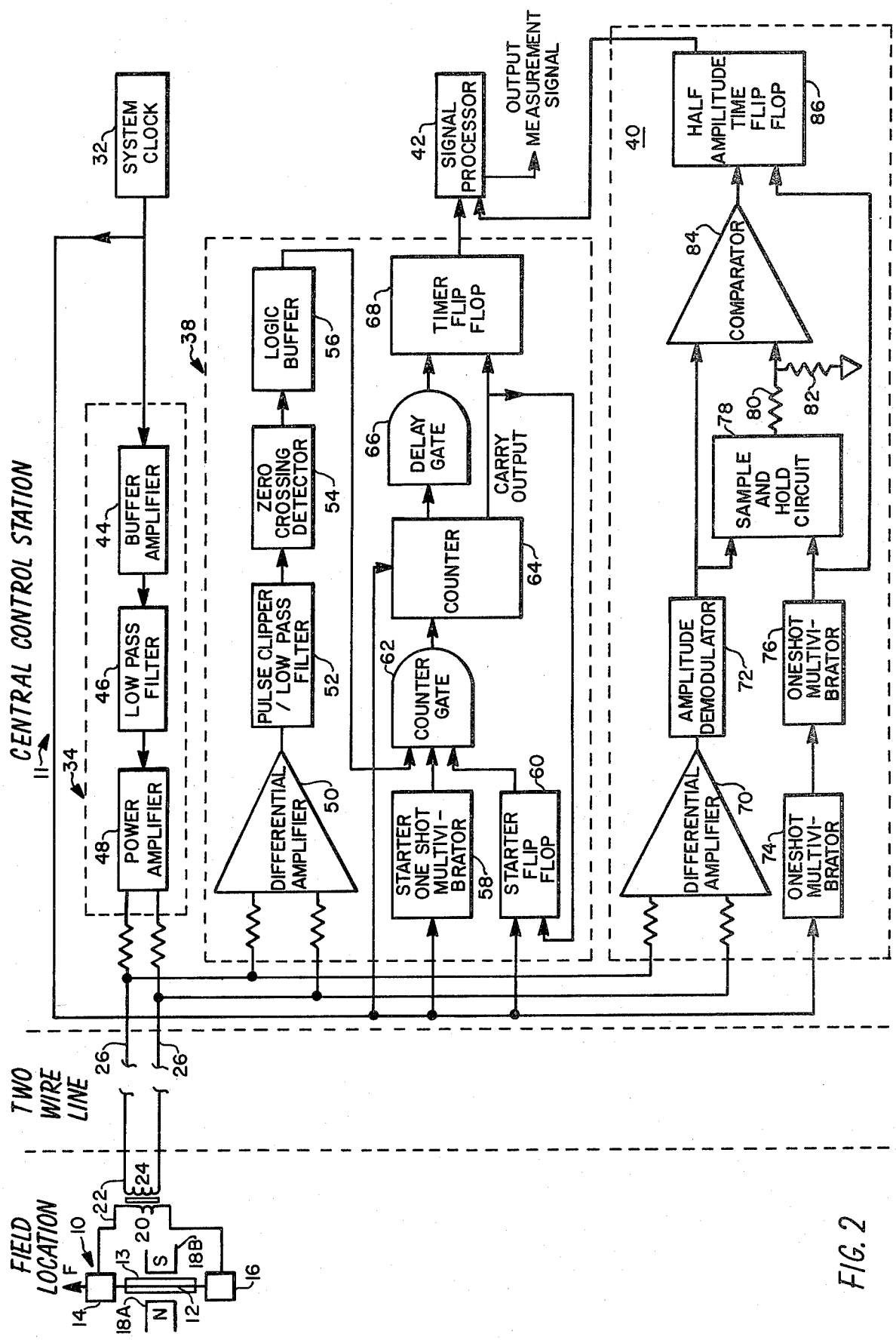
FIG. 2 is a more detailed description of the excitation and detection circuitry of the embodiment of FIG. 1.

Referring now to FIG. 2 for more detail of the circuitry at the central control station 11, the system clock 32 generates a 200-microsecond pulse with a 33-millisecond period. The output of the system clock is fed to a buffer amplifier 44 which in turn outputs to a low pass filter 46 resulting in the low pass filter producing a gaussian-like output pulse. Coupled to the output of the low pass filter is a power amplifier 48 for suitably amplifying the pulse before it is fed into the two-wire line 26. The pulse is then coupled through the transformer 22 to the force transducer 10 causing the vibrating wire 12 to oscillate in the surrounding liquid in a damped sinusoidal manner which, in turn, induces between the terminals 14 and 16 a voltage having the damped sinusoidal characteristics of the mechanical motion of the vibrating wire itself. This damped sinusoidal voltage is then passed through the transformer 22 and transmitted back over the two-wire line 26 to respective inputs of the frequency-to-pulse duration converter 38 and the half amplitude time-to-pulse duration converter 40.

A differential amplifier 50 amplifies the damped sinusoidal voltage and transmits it to a pulse clipper/low pass filter 52 where the initial peak is clipped and high frequency line noise is attenuated. The output of the low pass filter is fed to a zero crossing detector 54 whose purpose in conjunction with a logic buffer 56 is to produce appropriate logic transitions in correspondence with zero crossings of the filtered damped sinusoidal signal. The output of the system clock 32 also triggers a starter one-shot multivibrator 58 and sets a starter flip-flop 60. The outputs of the logic buffer 56, the starter one-shot multivibrator 58, and the starter flip-flop 60 are then fed to a counter gate 62. After the one-shot multivibrator has timed out, the output of the counter gate is a series of pulses whose durations are determined by the time between zero crossings of the damped sinusoid. This series of pulses is in turn fed to a counter 64. A delay gate 66, whose input is coupled to the output of the counter, sets a timer flip-flop 68 after four cycles of the damped sinusoid have been counted. After sixteen cycles, the counter produces a logic transition at its carry output which in turn is fed to the timer flip-flop 68, causing it to reset. This carry output is also fed back to the starter flip-flop 60, causing it to reset which results in the counter gate 62 being disabled. Thusly, the output of the timer flip-flop 68 is a pulse whose duration is equal to twelve cycles of the damped sinusoid. As shown, this signal is one input of the signal processor 42.

The system clock 32 synchronously enables the half amplitude time-to-pulse duration converter 40. The damped sinusoidal voltage produced by the vibrating wire 12 is also present at the input terminals of a differential amplifier 70. After amplification, an amplitude demodulator 72 eliminates the natural frequency of the vibrating wire 12 leaving at its output an exponentially decaying voltage having a decay characteristic nearly identical to the damped sinusoid. The system clock 32 triggers a one-shot multivibrator 74 of 4 millisecond duration, whose output in turn triggers a one-shot multivibrator 76 of 5 microsecond duration. During the period of time the one-shot multivibrator 76 is active, its output controls a sample and hold circuit 78 so that the output of the amplitude demodulator 72 is sampled for precisely this period of time. The value of the demodulator output voltage at the end of the sample period is then held for presentation to a precision voltage divider (made up of equal-valued resistors 80 and 82) by the sample and hold circuit until another sample period is initiated. After dividing the output of the sample and hold circuit in half, the precision voltage divider feeds its output to one input of a comparator 84. The other input to the comparator 84 is coupled to the output of the amplitude demodulator 72. When the demodulator output becomes equal to one-half the value it had at the end of the 5-microsecond sample period, the output of the comparator will change state. A half amplitude time flip-flop 86, whose set input is controlled by the output of the one-shot multivibrator 76 and whose reset input is controlled by the output of the comparator, will become set upon triggering of the one-shot 76 and remain set until such change of state by the comparator. Hence, the period of time the half amplitude time flip-flop is set is indicative of the time the damped sinusoid takes to decay to one-half the value it had at the end of the sample period. The output of the half amplitude time flip-flop is then fed to the signal processor 42 for processing along with the output of the timer flip-flop 68 discussed above.

The output measurement signal (i.e., the output of the signal processor 42) is dependent upon the value of the differential pressure and independent of the temperature of the liquid surrounding the wire making the instrument suitable for operation over an extremely wide range of temperatures such as from −50° F. to +250° F.

ALTERNATE EMBODIMENTS

Although the invention has been described in detail with respect to a specific illustrative example involving a pulse technique for supplying energy to the vibrating wire, energy may also be supplied to the wire in the form of a continuous wave by a positive feedback oscillator. Furthermore, the relationship between the resonant frequency of vibration of the wire and the differential pressure and liquid temperature along with the relationship between the damping factor of the wire and such temperature and differential pressure is still true. In a continuous wave system, the magnitude of the output voltage of the oscillator is dependent on the damping factor of the wire so that by measuring both this magnitude and the resonant frequency enables, as in the preferred embodiment, the differential pressure to be determined.

Figure 3:
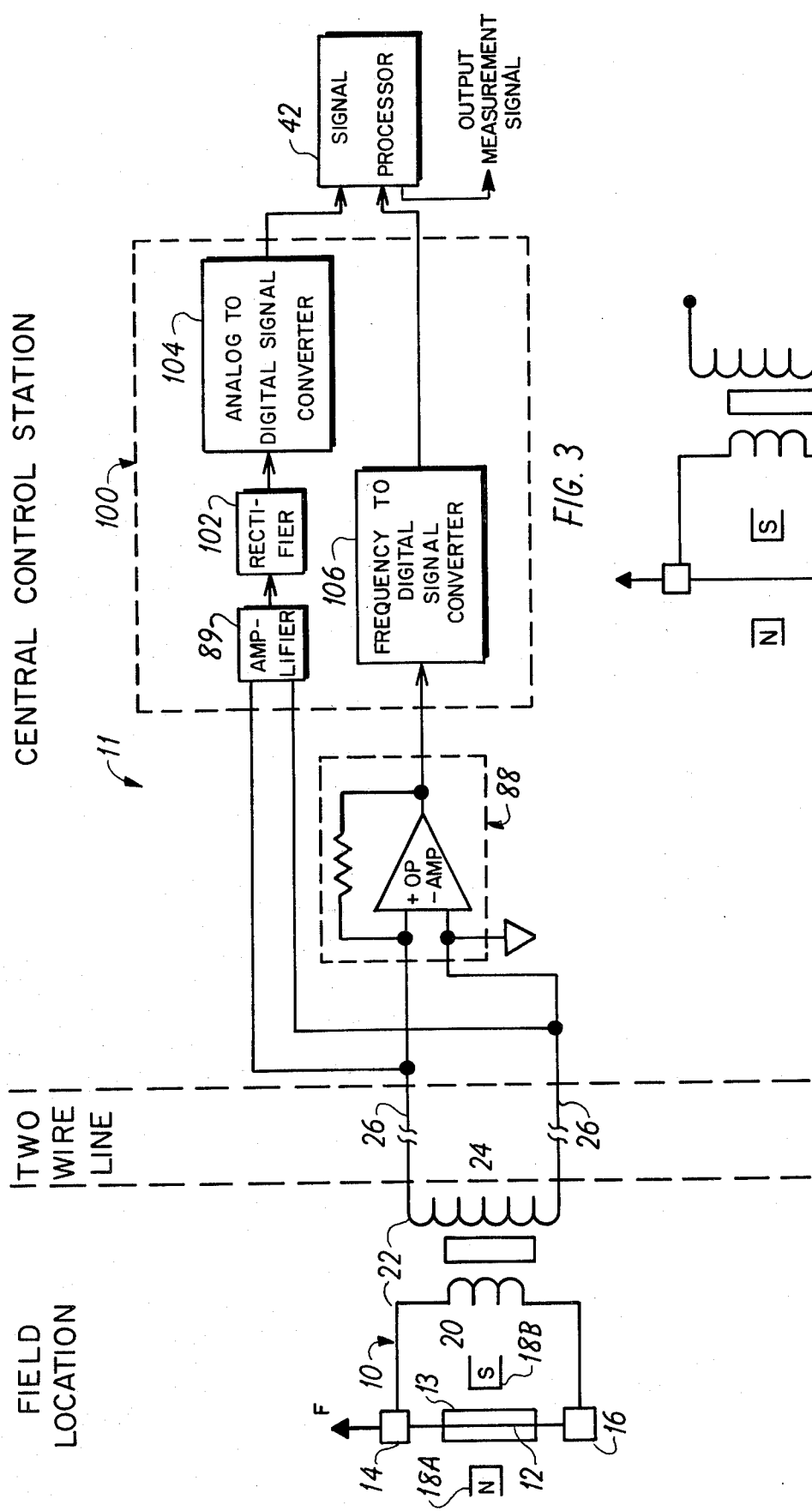
FIG. 3 is a combination block diagram-schematic of an alternate embodiment of the invention.

Referring now to FIG. 3 for more detail of this alternate embodiment, there is shown, as in the prior embodiment, the vibrating wire differential pressure transducer 10. Connecting the transducer to a central control station 11 is the two wire line 26. Included at the central control station is an oscillator 88 for supplying via the two-wire line a continuous wave of energy to maintain the vibrating wire 12 vibrating at its resonant frequency. The resonant characteristics of the wire are reflected back through the two wire line to set both the oscillator frequency and the magnitude of the oscillations appearing at the oscillator input in accordance with the prior mentioned differential pressure-temperature dependence. Detection circuitry 100 is connected so as to sense both the oscillator input and output signals. The detection circuitry includes an amplifier 89, a rectifier 102, an analog to digital signal converter 104 and a frequency to digital signal converter 106. The oscillator input signal is received by the amplifier. Following amplification, this signal is transmitted to the rectifier which in turn transmits its output to the analog to digital signal converter. On the other hand, the oscillator output signal is transmitted directly to the frequency to digital signal converter. Thusly, both the magnitude of the oscillations appearing at the input to the oscillator and the frequency of such oscillations are converted to digital signals for outputting to the signal processor 42. The signal processor then processes these digital signals according to the aforementioned known mathematical and physical principles. Hence, the output of the signal processor 42 is dependent on the value of the differential pressure and independent of the temperature of the liquid surrounding the wire.

Still another way to supply excitation energy to the vibrating wire is by sweeping through a band of sinusoidal frequencies including the resonant frequency and both half power frequencies. Measurement of both the output signal frequency and amplitude with these excitations will enable determination of the vibrating wire Q. Both the Q and the resonant frequency are dependent upon the differential pressure and the liquid temperature so that determination of them (Q and resonant frequency) will allow the differential pressure to be determined.

Figure 4:
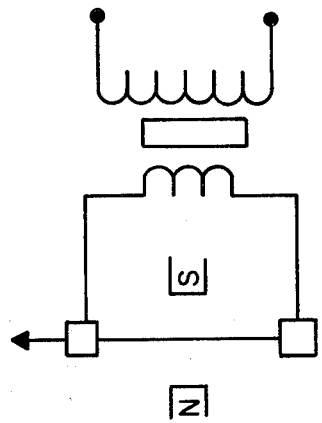
FIG. 4 is a schematic representation of another form of the vibrating wire transducer shown in the preferred embodiment.

FIG. 4 shows an alternate form of a vibrating wire transducer suitably adapted for use in accordance with the present invention. In this instance the vibrating wire is directly exposed to the ambient environment as opposed to being surrounded by a tube containing a liquid as is shown in FIGS. 1-3. Although depicted schematically here, such a transducer may be of the type disclosed in the aforementioned U.S. Pat. No. 4,149,422 to which reference may be made for further details. In applications where it is not necessary to have a liquid-filled type vibrating wire transducer, pulsing the wire offers the same advantages discussed above while eliminating need for additional circuitry to compensate for the temperature effects of the liquid.

Various other modified arrangements will become apparent to those of skill in the art from the above detailed descriptions. Accordingly, the true scope of the invention is not to be limited by these specific illustrative examples.

What is claimed is:

1. Industrial process instrument apparatus for developing at a central control station a signal responsive to the value of a process condition at a field measurement station remote from said central control station, said process condition being represented at said measurement station by a first variable dependent upon the value of such condition; said instrument comprising:
   resonant means located at said field measurement station, said resonant means being adapted to resonate at only a single resonant frequency and having two dissimilar characteristics, a first characteristic being dependent upon both the value of said first variable and the value of a second variable, and a second characteristic being dependent upon the value of at least one of said variables, said resonant means further capable of producing a signal at said single resonant frequency when supplied with excitation energy, said signal being dependent upon both said first and said second characteristics;
   means for coupling said resonant means to said central control station;
   said central control station including:
      electronic excitation means for supplying energy to said resonant means;
      first sensing means responsive to said first characteristic and for producing a signal dependent thereon;
      second sensing means responsive to said second characteristic and for producing a signal dependent thereon;
      said first characteristic signal and said second characteristic signal adapted to be combined in accordance with known physical principles to obtain an output measurement signal dependent upon the value of said first variable and independent of the value of said second variable, whereby said output measurement signal is dependent only upon the value of said process condition.

2. Apparatus as claimed in claim 1 wherein said resonant means is surrounded by a fluid.

3. Apparatus as claimed in claim 2 wherein said first characteristic is resonant frequency, said second characteristic is the damping factor, said resonant means is a vibrating wire and said fluid is a liquid.

4. Apparatus as claimed in claim 3 wherein said first variable is differential pressure and said second variable is temperature.

5. Apparatus as claimed in claim 4 wherein said coupling means is a two-wire line.

6. Apparatus as claimed in claim 1 wherein said coupling means is a two-wire line.

7. Apparatus as claimed in claim 1 wherein said first characteristic is resonant frequency and said second characteristic is the damping factor.

8. Industrial process instrument apparatus for developing at a central control station a signal responsive to the value of a process condition at a field measurement station remote from said central control station said process condition being represented at said measurement station by a differential pressure dependent upon the value of such condition; said instrument comprising:
   a vibrating wire located at said field measurement station said vibrating wire being surrounded by a liquid and having a resonant frequency and a damping factor, said resonant frequency and said damping factor both being dependent upon the differential pressure and the liquid temperature, said vibrating wire further capable of producing when excited a signal dependent upon both said resonant frequency and said damping factor, wherein when said vibrating wire is excited with a pulse of energy said signal has a frequency equal to said resonant frequency and a half amplitude time related to said damping factor;
   a two-wire line for coupling said vibrating wire to said central control station;
   said central control station including:
      pulse excitation means for supplying a pulse of energy to said vibrating wire;
      first sensing means responsive to the frequency of said vibrating wire signal and for producing a signal dependent thereon;
      second sensing means responsive to the half amplitude time of said vibrating wire signal and for producing a signal dependent thereon;
      said first sensing means signal and said second sensing means signal adapted to be combined in accordance with known physical principles to obtain an output measurement signal dependent upon the value of said differential pressure and independent of the value of said temperature, whereby said output measurement signal is dependent only upon the value of said process condition.

9. Apparatus as claimed in claim 8 wherein said second sensing means includes:
   means for producing an exponentially decaying voltage;
   means for sampling the value of said decaying voltage during a first predetermined period of time;
   means responsive to said sampling means for storing the value of said decaying voltage occurring at the end of said first predetermined period of time;
   voltage divider means coupled to said storing means for halving the value of said decaying voltage occurring at the end of said first predetermined period of time;
   comparator means for comparing the output of said voltage divider means and said exponentially decaying voltage and for producing a trigger signal when the value of said exponentially decaying voltage becomes equal to the output of said voltage divider.

10. Industrial process instrument apparatus for developing at a central control station a signal responsive to the value of a process condition at a field measurement station remote from said central station, said process condition being represented at said measurement station by a differential pressure dependent upon the value of such condition;
   said instrument comprising:
      a vibrating wire located at said field measurement station said vibrating wire being surrounded by a liquid and having a resonant frequency and a damping factor, said resonant frequency and said damping factor both being dependent upon the differential pressure and the liquid temperature, said vibrating wire further capable of producing when excited a signal dependent upon both said resonant frequency and said damping factor, wherein when said vibrating wire is excited with a continuous wave of energy said signal has a frequency equal to said resonant frequency and a magnitude related to said damping factor;
      a two-wire line for coupling said vibrating wire to said central control station;
      said central control station including:
         excitation means for supplying a continuous wave of energy to said vibrating wire;
         first sensing means responsive to the frequency of said vibrating wire signal and for producing a signal dependent thereon;
         second sensing means responsive to the magnitude of said vibrating wire signal and for producing a signal dependent thereon;
         said first sensing means signal and said second sensing means signal adapted to be combined in accordance with known physical principles to obtain an output measurement signal dependent only upon the value of said differential pressure and independent of the value of said temperature, whereby said output measurement signal is dependent only upon the value of said process condition.

11. Method for developing at a central control station a signal responsive to the value of a process condition at a field measurement station remote from said central control station, said process condition being represented at said measurement station by a first variable dependent upon the value of such condition; said method comprising:
   exciting a resonant means to produce an output, said resonant means being adapted to resonate at only a single resonant frequency, and having two dissimilar characteristics, a first characteristic being dependent upon the value of said first variable and the value of a second variable, and a second characteristic being dependent upon the value of at least one of said variables;
   producing a first signal at said single resonant frequency from the output of said resonant means said first signal being dependent upon said first characteristic;
   producing a second signal from the output of said resonant means, said second signal being dependent upon said second characteristic;
   combining in accordance with known physical principles said first and second signals so as to obtain an output measurement signal dependent upon the value of said first variable and independent of the value of said second variable, whereby said output measurement signal is dependent only upon the value of said process condition.

12. In an industrial process control system of the type having sensing elements located at a field measurement station for developing at a central control station remote from said measurement station electrical signals responsive to the value of a process condition, said process condition being represented at said measurement station by a variable parameter dependent upon the value of such condition, apparatus comprising:
   a vibrating wire located at said field measurement station, the tension, and hence the resonant frequency, of said wire varying in accordance with said parameter for producing a signal dependent upon said parameter;
   a two-wire line coupling said vibrating wire to said central control station;
   said central control station including:
      pulse excitation means adapted to produce a gaussian-like output pulse for energizing said vibrating wire in a free vibration mode only once per operating cycle of said apparatus;
      sensing means responsive to said variable parameter-dependent signal for producing a corresponding output measurement signal dependent upon the value of said variable parameter and hence said process condition.

13. An industrial process control instrumentation system of the type for producing at one location a measurement signal dependent upon a variable parameter representative of a process condition at a second location comprising:
   resonant means adjacent said second location, said resonant means being adapted to resonate at only a single resonant frequency;
   first circuit means coupled to said resonant means for supplying electrical energy thereto in response to which said resonant means produces a signal at said single resonant frequency that is composed of first and second dissimilar components, said first component being dependent upon said variable parameter and the value of a second and different variable, and said second component being dependent upon the value at least of one of said variables;
   second circuit means coupled to said resonant means and including first sensing means responsive to said first component and producing a corresponding signal and second sensing means responsive to said second component and producing a corresponding signal;

said first and second component signals adapted to be combined in accordance with known physical principles to produce an output measurement signal dependent upon the value of said variable parameter.

14. A system as claimed in claim 13 wherein said first and second circuit means are both at said one location.

* * * * *